US011485881B2

(12) United States Patent
Chen

(10) Patent No.: US 11,485,881 B2
(45) Date of Patent: Nov. 1, 2022

(54) HIGH TEMPERATURE STRUCTURAL ADHESIVE FILMS

(71) Applicant: 3M INNOVATIVE PROPERTIES COMPANY, St. Paul, MN (US)

(72) Inventor: Lianzhou Chen, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 261 days.

(21) Appl. No.: 16/767,952

(22) PCT Filed: Dec. 14, 2018

(86) PCT No.: PCT/IB2018/060133
§ 371 (c)(1),
(2) Date: May 28, 2020

(87) PCT Pub. No.: WO2019/116348
PCT Pub. Date: Jun. 20, 2019

(65) Prior Publication Data
US 2020/0369924 A1    Nov. 26, 2020

Related U.S. Application Data

(60) Provisional application No. 62/599,174, filed on Dec. 15, 2017.

(51) Int. Cl.
*B32B 7/12* (2006.01)
*C09J 7/29* (2018.01)
*B32B 7/023* (2019.01)
*C08L 63/00* (2006.01)
*C09J 163/00* (2006.01)
*C08K 3/22* (2006.01)

(52) U.S. Cl.
CPC ............... *C09J 7/29* (2018.01); *B32B 7/023* (2019.01); *B32B 7/12* (2013.01); *C08L 63/00* (2013.01); *C09J 163/00* (2013.01); *B32B 2264/0235* (2013.01); *B32B 2264/102* (2013.01); *B32B 2405/00* (2013.01); *B32B 2451/00* (2013.01); *B32B 2605/00* (2013.01); *C08K 2003/2241* (2013.01)

(58) Field of Classification Search
CPC .......... C08L 63/00; C08L 63/04; C08L 71/02; C08L 81/06; C09J 163/00; C09J 7/29; B32B 2264/0235; B32B 2264/102; B32B 2405/00; B32B 2451/00; B32B 2605/00; B32B 7/023; B32B 7/12; C08G 2650/50; C08G 65/4056; C08G 75/20; C08K 2003/2241; C08K 3/013
See application file for complete search history.

(56) References Cited

U.S. PATENT DOCUMENTS

| | | | |
|---|---|---|---|
| 3,018,262 A | 1/1962 | Schroeder | |
| 3,298,998 A | 1/1967 | McConnel | |
| 4,680,076 A | 7/1987 | Bard | |
| 5,084,532 A | 1/1992 | Schenkel | |
| 6,015,865 A | 1/2000 | Blank | |
| 6,439,550 B1* | 8/2002 | Koch | C08J 5/124 267/64.23 |
| 6,624,213 B2 | 9/2003 | George | |
| 8,518,208 B2 | 8/2013 | Kohli | |
| 2006/0182949 A1 | 8/2006 | Salnikov | |
| 2011/0048637 A1 | 3/2011 | Kohli | |
| 2014/0150970 A1 | 6/2014 | Desai | |
| 2015/0284608 A1 | 10/2015 | Hofstetter | |

FOREIGN PATENT DOCUMENTS

| | | |
|---|---|---|
| JP | H09-194566 | 7/1997 |
| JP | 2001-031839 | 2/2001 |
| RU | 2601480 | 11/2016 |
| WO | WO 2014-072449 | 5/2014 |
| WO | WO 2016-137671 | 9/2016 |
| WO | WO 2016-137791 | 9/2016 |

OTHER PUBLICATIONS

Lee, "Handbook of Epoxy Resins", McGraw-Hill Book Company, New York (1967), 3 pages.
Technical Bulletin "Selection and Processing Guide Virantage® PESU Tougheners," Solvay Specialty Polymers, 2014, 7 pages.
International Search Report for PCT International Application No. PCT/IB2018/060133, dated Apr. 30, 2019, 4 pages.

* cited by examiner

*Primary Examiner* — Lawrence D Ferguson
(74) *Attorney, Agent, or Firm* — Philip P. Soo

(57) ABSTRACT

Structural adhesive films are presented which comprise branched or networked polymers which are the reaction product of one or more polyether sulfone polymers, which may include amine-terminated polyether sulfone polymers and/or hydroxy-terminated polyether sulfone polymers, with epoxy-functional chemical species including the reaction product of one or more first polyepoxides with an amine-terminated branched polytetrahydrofuran polymer. The structural adhesive films may possess high strength, holding power and durability in high-temperature applications.

20 Claims, No Drawings

HIGH TEMPERATURE STRUCTURAL ADHESIVE FILMS

CROSS REFERENCE TO RELATED APPLICATIONS

This application is a national stage filing under 35 U.S.C. 371 of PCT/IB2018/060133, filed Dec. 14, 2018, which claims the benefit of US Patent Provisional Application No. 62/599174, filed Dec. 15, 2017, the disclosures of which are incorporated by reference in their entirety herein.

FIELD OF THE DISCLOSURE

This disclosure relates to structural adhesive films comprising branched or networked polymers incorporating, inter alia, polyether sulfone polymers and branched polytetrahydrofuran polymers. The structural adhesive films may possess high strength, holding power and durability in high-temperature applications.

BACKGROUND OF THE DISCLOSURE

The following references may be relevant to the general field of technology of the present disclosure: U.S. Pat. Nos. 8,518,208; 5,084,532; 6,015,865; JP 09194566; WO 2016/137791; WO 2016/137671; US 2015/0284608; WO 2014/072449; RU 2,601,480; JP 2001/031839; U.S. Pat. No. 6,624,213; and Solvay Technical Bulletin "Selection and Processing Guide Virantage® PESU Tougheners".

SUMMARY OF THE DISCLOSURE

Briefly, the present disclosure provides structural adhesive films comprising a highly branched or networked polymer which is the reaction product of one or more polyether sulfone polymers selected from the group consisting of amine-terminated polyether sulfone polymers, hydroxy-terminated polyether sulfone polymers, and combinations thereof, with epoxy-functional chemical species including the reaction product of one or more first polyepoxides with an amine-terminated branched polytetrahydrofuran polymer. In some embodiments, the epoxy-functional chemical species additionally include one or more second polyepoxides, which optionally may include polyepoxides comprising three or more epoxide groups per molecule and/or polyepoxides which are liquid epoxy resins. In some embodiments, the first polyepoxides may include polyepoxides comprising three or more epoxide groups per molecule. In some embodiments, the structural adhesive film may additionally include a coupling agent comprising a) one or more functional groups that may react to form covalent bonds with one or more components of the structural adhesive film and b) one or more functional groups that bind or associate with metal surfaces. In some embodiments, the structural adhesive film according to any of the preceding claims which comprises no species comprising non-aromatic carbon-carbon double bonds. Additional embodiments of the structural adhesive film of the present disclosure are described below under "Selected Embodiments."

In another aspect, the present disclosure provides cured films obtained by curing structural adhesive films according to any of the preceding claims. In another aspect, the present disclosure provides bonds comprising cured films according to the present disclosure bound to each of a first and second adherend.

The preceding summary of the present disclosure is not intended to describe each embodiment of the present invention. The details of one or more embodiments of the invention are also set forth in the description below. Other features, objects, and advantages of the invention will be apparent from the description and from the claims.

In this application, "polyepoxide" means a molecule comprising two or more epoxide groups.

In this application, the adjective "catenary" means in the chain or backbone of a polymer, e.g., an ether oxygen of a polyether polymer, as opposed to being pendent from the chain or backbone of a polymer.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides structural adhesive films which comprise a branched or networked polymer. The branched or networked polymer is the reaction product of one or more polyether sulfone polymers with epoxy-functional chemical species including a reaction product of polyepoxides with an amine-terminated branched polytetrahydrofuran polymer. In some embodiments, the epoxy-functional chemical species may include additional polyepoxides, which may be liquid epoxy resins and/or may comprises three or more epoxide groups per molecule.

In many embodiments, structural adhesive films according to the present disclosure exhibit high strength, holding power and durability in high-temperature applications, such as may be encountered in the aerospace and automotive industries.

In many embodiments, structural adhesive films according to the present disclosure exclude materials, such as polyisoprenes or polybutadienes, which contain C—C double bonds. Such materials have been used as tougheners in structural adhesive films. Without wishing to be bound by theory, applicants believe that many embodiments of the structural adhesive films of the present disclosure exhibit greater high temperature durability in part because they achieve toughness without the use of materials that contain C—C double bonds, which may degrade over time at high temperature. At the same time, it is believed that the use of a polytetrahydrofuran polymer, when compared to polyethers having greater oxygen and lesser carbon content, increases incompatibility with epoxy components during the curing process resulting in the creation of independent rubbery domains.

Any suitable amine-terminated branched polytetrahydrofuran polymer may be used in the practice of the present disclosure. The amine-terminated branched polytetrahydrofuran polymer can have a glass transition temperature of less than 20° C., 15, 10, 5, 0, −5, −10, −15, −20, −25, −30, −35, −40, −45, −50, −55, −60, or −65° C. Commercial examples include "3M EPX rubber" high molecular weight amine terminated polytetramethylene oxide by 3M Company, St. Paul, Minn.; which has an average molecular weight of approximately 9,000-15,000 g/mol. Additional embodiments of amine-terminated branched polytetrahydrofuran polymers that may be used in the practice of the present disclosure are described below under "Selected Embodiments" and in the Examples.

Any suitable polyepoxides may be used as the first or second polyepoxides in the practice of the present disclosure. In some embodiments, polyepoxides comprising three or more epoxide groups per molecule may be used. In some embodiments, polyepoxides may be room temperature liquids. In some embodiments, polyepoxides may be room temperature solids. Suitable polyepoxides may be saturated or unsaturated, aliphatic, alicyclic, aromatic, or heterocyclic, or a combination thereof. Suitable polyepoxides may be monomeric or polymeric.

Aromatic polyepoxides contain at least one aromatic ring (such as a phenyl group) that is optionally substituted by a halogen, alkyl having 1 to 4 carbon atoms (e.g., methyl or ethyl), or hydroxyalkyl having 1 to 4 carbon atoms (e.g., hydroxymethyl). In some embodiments, the aromatic polyepoxide contains at least two or more aromatic rings and in some embodiments, can contain 1 to 4 aromatic rings. For polyepoxides and epoxy resin repeating units containing two or more aromatic rings, the rings may be connected, for example, by a branched or straight-chain alkylene group having 1 to 4 carbon atoms that may optionally be substituted by a halogen (e.g., fluoro, chloro, bromo, iodo).

In some embodiments, the epoxy resin is a novolac epoxy resin (e.g., phenol novolacs, ortho-, meta-, or para-cresol novolacs or combinations thereof) containing more than two epoxy groups per molecule. Novolac epoxy resins can be obtained by reacting a phenolic novolac resin with epichlorohydrin. When cured, these resins can provide increased crosslink density due to the increased epoxy functionality, such as provided by a multifunctional epoxy having an average functionality of greater than 2, greater than 3, greater than 4, greater than 5, or greater than 6. The epoxy resin may also include a bisphenol epoxy resin (e.g., bisphenol A, bisphenol E, bisphenol F, halogenated bisphenol epoxies, fluorene epoxies, and combinations thereof), a resorcinol epoxy resin, and combinations of any of these.

Particular aromatic monomeric polyepoxides include the diglycidyl ethers of bisphenol A and bisphenol F and tetrakis glycidyl-4-phenylolethane and combinations thereof. In these aromatic polyepoxides, either of the phenyl rings or the methylene group may be substituted by halogen (e.g., fluoro, chloro, bromo, iodo), methyl, trifluoromethyl, or hydroxymethyl. Useful aromatic polyepoxides also include polyglycidyl ethers of polyhydric phenols, glycidyl esters of aromatic carboxylic acid, N-glycidylaminobenzenes, and glycidylamino-glycidyloxy-benzenes.

Polyglycidyl derivatives of polyhydric phenols include 2,2-bis-[4-(2,3-epoxypropoxy)phenyl]propane and those described in U.S. Pat. No. 3,018,262 (Schroeder) and U.S. Pat. No. 3,298,998 (Coover et al.), and in "Handbook of Epoxy Resins" by Lee and Neville, McGraw-Hill Book Co., New York (1967). Useful polyglycidyl ethers of polyhydric phenols described above are diglycidyl ethers of bisphenol that have pendent carbocyclic groups. Examples of such diglycidyl ethers are 2,2-bis[4-(2,3-epoxypropoxy)phenyl] norcamphane and 2,2-bis[4-(2,3-epoxypropoxy)phenyl] decahydro-1,4,5,8-dimethanonaphthalene. Useful polyglycidyl derivatives include 9,9-bis[4-(2,3-epoxypropoxy) phenyl]fluorene and tetraglycidyl methylene dianiline (TGMDA), also known as tetraglycidyl-4,4 N-diaminodiphenylmethane (TGGDM).

Additional embodiments of polyepoxides that may be used in the practice of the present disclosure are described below under "Selected Embodiments" and in the Examples.

Any suitable polyether sulfone polymers may be used in the practice of the present disclosure. Polyether sulfone polymers are polymers which include repeating catenary ether and repeating catenary sulfone groups, which typically alternate over the length of the polymer. Suitable polyether sulfone polymers typically also include catenary arylene groups, in particular catenary phenylene groups. In some embodiments suitable polyether sulfone polymers include no grafted polymer segments of a type other than polyether sulfone polymer. Some embodiments employ hydroxy-terminated polyether sulfone polymer(s). Some embodiments employ amine-terminated polyether sulfone polymer(s). Some embodiments employ a mixture of hydroxy-terminated polyether sulfone polymer(s) and amine-terminated polyether sulfone polymer(s). Suitable polyether sulfones may include those sold under the UDEL®, VERSADEL® or VIRANTAGE® brands available from Solvay S.A., Brussels, Belgium. Applicants note that the terms polysulfone, polyarylenesufone and polyphenylenesupfone may sometimes be used to describe polyether sulfones. In some embodiments, suitable polyether sulfones may have an average molecular weight of at least 4,000 g/mol, in some embodiments at least 6,000 g/mol, in some embodiments at least 8,000 g/mol, in some embodiments at least 10,000 g/mol, and in some embodiments at least 12,000 g/mol. Additional embodiments of polyether sulfone polymers that may be used in the practice of the present disclosure are described below under "Selected Embodiments" and in the Examples.

Any suitable reaction conditions may be used to form the reaction product of polyepoxides with an amine-terminated branched polytetrahydrofuran polymer. Typically, the reaction will proceed with application of heat, however optionally one or more catalysts may be included. In some embodiments, no solvent is added other than that present in commercially available reactant materials. In some embodiments, solvent is added. In some embodiments, no solvent is present. Additional embodiments of suitable reaction conditions may be used in the practice of the present disclosure are described below under "Selected Embodiments" and in the Examples.

Any suitable reaction conditions may be used to form the branched or networked polymer. Typically, the reaction will proceed with application of heat, however optionally one or more catalysts may be included. In some embodiments, no solvent is added other than that present in commercially available reactant materials. In some embodiments, solvent is added. In some embodiments, no solvent is present. Additives or fillers may be mixed in during or after reaction. Curatives may be mixed in after reaction, under conditions such as reduced heat which avoid premature activation of the curatives. Additional embodiments of suitable reaction conditions may be used in the practice of the present disclosure are described below under "Selected Embodiments" and in the Examples.

The mixture comprising the branched or networked polymer and optionally additives and/or curatives may be formed into a film by any suitable method, which may include extrusion, coating, spraying, spin coating, bar coating, and the like.

Some embodiments of the structural adhesive films according to the present disclosure comprise coupling agents to improve adhesion to metal substrates. Any suitable coupling agents may be used. Suitable coupling agents typically comprise a) one or more functional groups that may react to form covalent bonds with one or more components of the structural adhesive film and b) one or more functional groups that bind or associate with metal surfaces. In some embodiments, part a) may include functional groups that form bonds with epoxide groups, which may include amine and hydroxy groups. In some embodiments, part a) may include functional groups that form bonds with amine and hydroxy groups, which may include epoxide groups. In some embodiments, part b) may include functional groups that form covalent bonds with metal surfaces. In some embodiments, part b) may include functional groups that form ionic bonds with metal surfaces. In some embodiments, part b) may include functional groups that have a strong affinity for metal surfaces. In some embodiments, part b) may include silane groups, alkoxy silane groups, or more specifically trimethoxy silane groups. In some embodiments, coupling agents are added during the reaction of polyepoxides with amine-terminated branched polytetrahydrofuran polymer. In some embodiments, coupling agents are added during the reaction of polyether sulfone polymers with the reaction product of polyepoxides with an amine-terminated branched polytetrahydrofuran polymer. Additional embodiments of coupling agents that may be used in the practice of the present disclosure are described below under "Selected Embodiments" and in the Examples.

Many embodiments of the structural adhesive films according to the present disclosure comprise epoxy curatives. Any suitable curatives may be used. Suitable curatives may include anhydrides, amines, polyamides, Lewis acids, salts and others. Additional embodiments of epoxy curatives that may be used in the practice of the present disclosure are described below under "Selected Embodiments" and in the Examples.

Some embodiments of the structural adhesive films according to the present disclosure comprise additives. In various embodiments may include fillers, which may include one or more of aluminum particles, polyaramid particles, polyimide particles, silica particles, and fumed silica particles. In some embodiments additives may include antioxidants. Additional embodiments of the use of additives in the practice of the present disclosure are described below under "Selected Embodiments" and in the Examples.

The structural adhesive films according to the present disclosure may be used in any suitable manner. Typically, the films are used to adhere two adherends by bringing the adherends and film in contact, optionally applying pressure to maximize contact, and applying sufficient heat to cure the film, optionally under elevated atmospheric pressure such as in an autoclave. In some embodiments, a typical cure temperature for structural adhesive films according to the present disclosure is 177° C. (350° F.). In some embodiments, structural adhesive films according to the present disclosure may be cured at temperatures of up to 204° C. (400° F.). In some embodiments, one or both adherends is metal, such as aluminum, steel, stainless steel, or titanium. Additional embodiments of methods of use of the films of the present disclosure are described below under "Selected Embodiments" and in the Examples.

Selected Embodiments

The following embodiments, designated by letter and number, are intended to further illustrate the present disclosure but should not be construed to unduly limit this disclosure.

A1. A structural adhesive film comprising a branched or networked polymer which is the reaction product of one or more polyether sulfone polymers selected from the group consisting of amine-terminated polyether sulfone polymers, hydroxy-terminated polyether sulfone polymers, and combinations thereof, with epoxy-functional chemical species including the reaction product of one or more first polyepoxides with an amine-terminated branched polytetrahydrofuran polymer.

A2. The structural adhesive film according to any of the preceding embodiments wherein said epoxy-functional chemical species additionally include one or more second polyepoxides.

A3. The structural adhesive film according to embodiment A2 wherein at least one second polyepoxide comprises three or more epoxide groups per molecule.

A4. The structural adhesive film according to embodiment A2 or A3 wherein at least one second polyepoxide is a room temperature liquid.

A5. The structural adhesive film according to any of the embodiments A2-A4 where the one or more second polyepoxides and the reaction product of one or more first polyepoxides with an amine-terminated branched polytetrahydrofuran polymer are present in the epoxy-functional chemical species in a first weight ratio of greater than 0.05:1.00.

A6. The structural adhesive film according to embodiment A5 where the first weight ratio is greater than 0.30:1.00.

A7. The structural adhesive film according to embodiment A5 where the first weight ratio is greater than 0.55:1.00.

A8. The structural adhesive film according to any of embodiments A2-A7 where the one or more second polyepoxides and the reaction product of one or more first polyepoxides with an amine-terminated branched polytetrahydrofuran polymer are present in the epoxy-functional chemical species in a first weight ratio of less than 4.0:1.0.

A9. The structural adhesive film according to any of embodiments A5-A8 where the first weight ratio is less than 3.0:1.0.

A10. The structural adhesive film according to any of embodiments A5-A8 where the first weight ratio is less than 2.0:1.0.

A11. The structural adhesive film according to any of embodiments A5-A8 where the first weight ratio is less than 1.0:1.0.

A12. The structural adhesive film according to any of embodiments A5-A8 where the first weight ratio is less than 0.8:1.0.

A13. The structural adhesive film according to any of the preceding embodiments wherein the reaction product of one or more first polyepoxides with an amine-terminated branched polytetrahydrofuran polymer comprises terminal epoxide groups.

A14. The structural adhesive film according to any of the preceding embodiments wherein the branched or networked polymer comprises terminal epoxide groups.

A15. The structural adhesive film according to any of the preceding embodiments wherein at least one first polyepoxide comprises three or more epoxide groups per molecule.

A16. The structural adhesive film according to any of embodiments A1-A15 wherein the one or more polyether sulfone polymers are selected from the group consisting of hydroxy-terminated polyether sulfone polymers.

A17. The structural adhesive film according to any of embodiments A1-A15 wherein the one or more polyether sulfone polymers are selected from the group consisting of amine-terminated polyether sulfone polymers.

A18. The structural adhesive film according to any of embodiments A1-A15 wherein the one or more polyether sulfone polymers include at least one hydroxy-terminated polyether sulfone polymer and at least one amine-terminated polyether sulfone polymer.

A19. The structural adhesive film according to any of the preceding embodiments additionally comprising a coupling agent comprising a) one or more functional groups that can react to form covalent bonds with one or more components of the structural adhesive film and b) one or more functional groups that bind or associate with metal surfaces.

A20. The structural adhesive film according to embodiment A19 wherein a) includes functional groups selected from the group consisting of amine, hydroxy and epoxide groups.

A21. The structural adhesive film according to embodiment A19 wherein a) includes an epoxide group.

A22. The structural adhesive film according to any of embodiments A19-A21 wherein b) includes a silane group.

A23. The structural adhesive film according to any of embodiments A19-A21 wherein b) includes an alkoxy silane group.

A24. The structural adhesive film according to any of embodiments A19-A21 wherein b) includes a trimethoxy silane group.

A25. The structural adhesive film according to any of the preceding embodiments wherein the one or more first polyepoxides have an average functionality of at least 2.1 epoxide groups per molecule.

A26. The structural adhesive film according to any of the preceding embodiments wherein the one or more first polyepoxides have an average functionality of at least 2.5 epoxide groups per molecule.

A27. The structural adhesive film according to any of the preceding embodiments wherein the one or more first polyepoxides have an average functionality of at least 2.8 epoxide groups per molecule.

A28. The structural adhesive film according to any of the preceding embodiments wherein the one or more first polyepoxides have an average functionality of at least 3.2 epoxide groups per molecule.

A29. The structural adhesive film according to any of the preceding embodiments wherein the one or more first polyepoxides have an average functionality of at least 4.0 epoxide groups per molecule.

A30. The structural adhesive film according to any of the preceding embodiments wherein the one or more first polyepoxides have an average functionality of at least 5.0 epoxide groups per molecule.

A31. The structural adhesive film according to any of the preceding embodiments wherein the one or more first polyepoxides have an average functionality of at least 6.0 epoxide groups per molecule.

A32. The structural adhesive film according to any of the preceding embodiments wherein the one or more second polyepoxides have an average functionality of at least 2.1 epoxide groups per molecule.

A33. The structural adhesive film according to any of the preceding embodiments wherein the one or more second polyepoxides have an average functionality of at least 2.5 epoxide groups per molecule.

A34. The structural adhesive film according to any of the preceding embodiments wherein the one or more second polyepoxides have an average functionality of at least 2.8 epoxide groups per molecule.

AR1. The structural adhesive film according to any of the preceding embodiments wherein the reaction product of one or more first polyepoxides with an amine-terminated branched polytetrahydrofuran polymer incorporates the one or more first polyepoxides and the amine-terminated branched polytetrahydrofuran polymer in a second weight ratio of greater than 1.2:1.0.

AR2. The structural adhesive film according to embodiment AR1 wherein the second weight ratio is greater than 1.3:1.0.

AR3. The structural adhesive film according to embodiment AR1 wherein the second weight ratio is greater than 1.4:1.0.

AR4. The structural adhesive film according to embodiment AR1 wherein the second weight ratio is greater than 1.5:1.0.

AR5. The structural adhesive film according to embodiment AR1 wherein the second weight ratio is greater than 1.6:1.0.

AR6. The structural adhesive film according to any of the preceding embodiments wherein the reaction product of one or more first polyepoxides with an amine-terminated branched polytetrahydrofuran polymer incorporates the one or more first polyepoxides and the amine-terminated branched polytetrahydrofuran polymer in a second weight ratio of less than 3.0:1.0.

AR7. The structural adhesive film according to any of embodiments AR1-AR6 wherein the second weight ratio is less than 2.5:1.0.

ARB. The structural adhesive film according to any of embodiments AR1-AR6 wherein the second weight ratio is less than 2.2:1.0.

AR9. The structural adhesive film according to any of embodiments AR1-AR6 wherein the second weight ratio is less than 2.0:1.0.

AR10. The structural adhesive film according to any of embodiments AR1-AR6 wherein the second weight ratio is less than 1.8:1.0.

AR11. The structural adhesive film according to any of the preceding embodiments wherein the branched or networked polymer incorporates the one or more polyether sulfone polymers and the epoxy-functional chemical species in a third weight ratio of greater than 0.010:1.000.

AR12. The structural adhesive film according to embodiment AR11 wherein the third weight ratio is greater than 0.020:1.000.

AR13. The structural adhesive film according to embodiment AR11 wherein the third weight ratio is greater than 0.032:1.000.

AR14. The structural adhesive film according to embodiment AR11 wherein the third weight ratio is greater than 0.040:1.000.

AR15. The structural adhesive film according to any of the preceding embodiments wherein the branched or networked polymer incorporates the one or more polyether sulfone polymers and the epoxy-functional chemical species in a third weight ratio of less than 0.300:1.000.

AR16. The structural adhesive film according to any of embodiments AR11-AR15 wherein the third weight ratio is less than 0.200:1.000.

AR17. The structural adhesive film according to any of embodiments AR11-AR15 wherein the third weight ratio is less than 0.100:1.000.

AR18. The structural adhesive film according to any of embodiments AR11-AR15 wherein the third weight ratio is less than 0.080:1.000.

AR19. The structural adhesive film according to any of embodiments AR11-AR15 wherein the third weight ratio is less than 0.070:1.000.

AR20. The structural adhesive film according to any of embodiments AR11-AR15 wherein the third weight ratio is less than 0.060:1.000.

AR21. The structural adhesive film according to any of embodiments AR11-AR15 wherein the third weight ratio is less than 0.050:1.000.

AR22. The structural adhesive film according to any of the preceding embodiments wherein the amine-terminated branched polytetrahydrofuran polymer has a Mw of greater than 2000 g/mol.

AR23. The structural adhesive film according to any of the preceding embodiments wherein the amine-terminated branched polytetrahydrofuran polymer has a Mw of greater than 3000 g/mol.

AR24. The structural adhesive film according to any of the preceding embodiments wherein the amine-terminated branched polytetrahydrofuran polymer has a Mw of greater than 4000 g/mol.

AR25. The structural adhesive film according to any of the preceding embodiments wherein the amine-terminated branched polytetrahydrofuran polymer has a Mw of greater than 5000 g/mol.

AR26. The structural adhesive film according to any of the preceding embodiments wherein the amine-terminated branched polytetrahydrofuran polymer has a Mw of greater than 6000 g/mol.

AR27. The structural adhesive film according to any of the preceding embodiments wherein the amine-terminated branched polytetrahydrofuran polymer has a Mw of greater than 7000 g/mol.

AR28. The structural adhesive film according to any of the preceding embodiments wherein the amine-terminated branched polytetrahydrofuran polymer has a Mw of greater than 8000 g/mol.

AR29. The structural adhesive film according to any of the preceding embodiments wherein the amine-terminated branched polytetrahydrofuran polymer has a Mw of greater than 9000 g/mol.

AR30. The structural adhesive film according to any of the preceding embodiments wherein the amine-terminated branched polytetrahydrofuran polymer has a Mw of less than 20000 g/mol.

AR31. The structural adhesive film according to any of the preceding embodiments wherein the amine-terminated branched polytetrahydrofuran polymer has a Mw of less than 18000 g/mol.

AR32. The structural adhesive film according to any of the preceding embodiments wherein the amine-terminated branched polytetrahydrofuran polymer has a Mw of less than 15000 g/mol.

AN1. The structural adhesive film according to any of the preceding embodiments wherein the amine-terminated branched polytetrahydrofuran polymer comprises no non-aromatic carbon-carbon double bonds.

AN2. The structural adhesive film according to any of the preceding embodiments wherein the reaction product of one or more polyepoxides with an amine-terminated branched polytetrahydrofuran polymer comprises no non-aromatic carbon-carbon double bonds.

AN3. The structural adhesive film according to any of the preceding embodiments wherein the branched or networked polymer comprises no non-aromatic carbon-carbon double bonds.

AN4. The structural adhesive film according to any of the preceding embodiments which comprises no species comprising non-aromatic carbon-carbon double bonds.

AN5. The structural adhesive film according to any of the preceding embodiments which comprises no elastomer comprising non-aromatic carbon-carbon double bonds.

AN6. The structural adhesive film according to any of the preceding embodiments which comprises no polymeric core-shell particles.

AN7. The structural adhesive film according to any of the preceding embodiments additionally comprising one or more fillers.

AN8. The structural adhesive film according to embodiment AN7 wherein the one or more fillers include one or more of aluminum particles, polyaramid particles, polyimide particles, silica particles, and fumed silica particles.

AN9. The structural adhesive film according to embodiment AN7 wherein the one or more fillers include polyaramid aluminum particles.

AN10. The structural adhesive film according to embodiment AN7 or AM9 wherein the one or more fillers include polyaramid particles.

AN11. The structural adhesive film according to embodiment AN7 or AN9 wherein the one or more fillers include fumed silica particles.

AN12. The structural adhesive film according to any of the preceding embodiments additionally comprising one or more epoxy curatives.

AN13. The structural adhesive film according to embodiment AN12 wherein the one or more epoxy curatives include one or more amine-functional species.

AN14. The structural adhesive film according to embodiment AN12 or AN13 wherein the one or more epoxy curatives include dicyandiamide.

CB1. A cured film obtained by curing the structural adhesive film according to any of the preceding embodiments.

CB2. A bond comprising the cured film according to embodiment CB1 bound to each of a first and second adherend.

CB3. The bond according to embodiment CB2 wherein at least one of the first and second adherend is metal.

CB4. The bond according to embodiment CB2 wherein at least one of the first and second adherend is aluminum.

CB5. The bond according to embodiment CB2 wherein at least one of the first and second adherend is steel.

CB6. The bond according to any of embodiments CB2-CB5 wherein at least one of the first and second adherend is fiber matrix composite.

CB7. The bond according to any of embodiments CB2-CB6 wherein at least one of the first and second adherend is fiber matrix composite.

Objects and advantages of this disclosure are further illustrated by the following examples, but the particular materials and amounts thereof recited in these examples, as well as other conditions and details, should not be construed to unduly limit this disclosure.

Examples

Unless otherwise noted, all reagents were obtained or are available from Aldrich Chemical Co., Milwaukee, Wis., or may be synthesized by known methods.

Unless otherwise noted, all parts, percentages, ratios, etc. in the Examples and the rest of the specification are by weight.

TABLE 1

| Designation | Description | Source |
| --- | --- | --- |
| Al | Spherical aluminum powder | Toyal America, Inc., Naperville, IL |
| R816 | A treated fumed silica, available under the trade designation "AEROSIL R816" | Evonik, Parsippany, NJ |
| ATPES | amine terminated polyether sulfone, available under the trade designation "ATPES" or "VW-30500 RP" | Solvay, Brussels, Belgium |
| DICY | A micronized dicyandiamide, having an approximate amine equivalent weight of 21 grams/equivalent, available under the trade designation "ANCAMINE CG-1400" | Air Products and Chemicals Inc., Allentown, PA |
| ECN 1299 | A solid novolac epoxy resin, available under the trade designation "ECN 1299" | Huntsman Advanced Materials Americas Inc., The Woodlands, TX |
| EPON 1002 | A bisphenol A extended solid epoxy, available under the trade designation "EPON 1002" | Momentive, Columbus, OH |
| EPON 1004 | A bisphenol A extended solid epoxy, available under the trade designation "EPON 1004" | Momentive, Columbus, OH |
| EPX | A high molecular weight (approximately 9,000-15,000 g/mol weight average molecular weight) amine terminated branched polytetramethylene oxide, available under the trade designation "3M EPX RUBBER" | 3M Co., St. Paul, MN |
| IRGANOX 1010 | An antioxidant, available under the trade designation "IRGANOX 1010" | BASF, Ludwigshafen, Germany |
| KEVLAR PULP | An abrasion resistant filler, available under the trade designation "KEVLAR PULP" | DuPont, Wilmington, DE |
| MY-0510 | Multifunctional triglycidyl ether of para-aminophenol, obtained under the trade designation "ARALDITE MY-0510" | Huntsman Advanced Chemicals, Woodlands, TX |
| S -9228 | A solid phosphite antioxidant, available under the trade designation "S-9228" | Dover Chemical Corp., Dover, OH |
| VW-10200RP | An OH terminated polyether sulfone, available under the trade designation "VW-10200 RP" | Solvay, Brussels, Belgium |
| VW-10700RP | An OH terminated polyether sulfone, available under the trade designation "VW-10700 RP" | Solvay, Brussels, Belgium |
| Z-6040 | A glycidoxypropyltrimethoxysilane, a coupling agent available under the trade designation "Z-6040" | Dow Corning, Midland, MI |
| DDS | 4,4-diamino diphenyl sulfone | Huntsman Advanced Chemicals, Woodlands, TX |
| P-1800 | Hydroxy-terminated polysulfone polymer having a molecular weight of about 55,000 to 60,000 available under the trade designation "Udel P1800" | Solvay, Brussels, Belgium |

Test Methods

Prior to bonding with structural adhesive, Grade 2024T3 bare aluminum panels were subjected to the following surface preparation process:

FPL Etched and Phosphoric Acid Anodized and Primed Aluminum Substrate

Aluminum panels were treated as follows before bonding:
1) soaking for 10 minutes in OAKITE 165 CAUSTIC WASH SOLUTION (available from Chemetall GmbH, Germany) at a temperature of 85° C.;
2) the panels (in a rack) were then submerged in tank of deionized water for 10 minutes;
3) the panels were spray rinsed with deionized water for 2-3 minutes;
4) the panels were then soaked in a tank of "FPL ETCH" (a hot solution of sulfuric acid and sodium dichromate from Forest Products Laboratory of Madison, Wis.) at 66° C. for 10 minutes;
5) the panels were spray rinsed with deionized water for 2-3 minutes; and
6) the panels were allowed to drip dry for 10 minutes at ambient temperature, and then for 30 minutes in a re-circulating air oven at 54° C.

In all cases, the panels were further treated as follows. The etched panels were anodized by immersion in phosphoric acid at 22° C. with an applied voltage of 15 volts for 20-25 minutes, followed by rinsing with tap water (test for water break), air drying for 10 minutes at room temperature, then oven drying in a forced air oven at 66° C. for 10 minutes. The resulting anodized aluminum panels were then primed within 24 hours of treatment. The anodized panels were primed with a corrosion inhibiting primer for aluminum ("3M SCOTCH-WELD STRUCTURAL ADHESIVE PRIMER EC 3917", available from 3M, St. Paul, Minn. or the primers specified in the table) according to the manufacturer's instructions to give a dried primer thickness of between 0.00010 and 0.00020 inch (2.5 to 5.1 micrometers).

Adhesive Cure Cycle

The bonded sample using a film adhesive made in the examples was vacuum bagged to a pressure of approximately 28 inches mercury (94.8 kPa) in an autoclave, model number "ECONOCLAVE 3×5", from ASC Process Systems, Sylmar, Calif. Autoclave pressure was increased to 45 psi (310.3 kPa), during which the vacuum bag was vented to the atmosphere once the autoclave pressure surpassed 15 psi (103.4 kPa). Autoclave temperature was then increased at a rate of 4.5° F. (2.5° C.) per minute to 350° F. (177° C.). After reaching the set point the sample was held for 60-90 minutes at this temperature, then cooled at a rate of 5° F. (2.8° C.) per minute to 72° F. (22.2° C.) before releasing the pressure.

Overlap Shear ("OLS") Testing

One liner was removed from a 1-inch (25.4 mm) by ⅝-inch (15.9 mm) wide strip of structural adhesive film and the exposed adhesive manually pressed along the longer edge of a 63 mil (1.60 mm) thick, 4-inch by 7-inch (10.16 cm by 17.78 cm) aluminum test panel. After removing any trapped air bubbles by means of a rubber roller, the opposing liner was removed and another test panel was pressed onto the exposed adhesive, at an overlap of 0.5 inches (12.7 mm). The assembly was then taped together and autoclaved according to one of the cure cycles described above, after which the co-joined panels were cut into seven strips, each measuring 1-inch by 7.5 inches (2.54 by 19.05 cm). The strips were then evaluated for overlap shear strength according to ASTM D-1002, using a tensile strength tester, model "SINTECH 30" from MTS Corporation, Eden Prairie, Minn., at 70° F. (21.1° C.) and a grip separation rate of 0.05 inches/min. (1.27 mm/min.). Six overlap shear test panels were prepared and evaluated per each example.

Testing was conducted at room temperature (75° F., 24° C.) and at elevated temperature, as specified.

Floating Roller Peel ("FRP") Strength Test for Adhesive Film

Primed panels of 2024-T3 bare aluminum measuring 8 inches long times 3 inches wide times 0.063 inches thick (20.3 times 7.6 times 0.16 centimeters), and 10 inches long times 3 inches wide times 0.025 inches thick (25.4 times 7.6 times 0.064 centimeters), were prepared for testing as described above in "FPL Etched and Phosphoric Acid Anodized Aluminum Substrate". The primed panels were bonded together using the same structural adhesive sample and cure process employed for the overlap shear samples, then evaluated for floating roller peel strength in accordance with ASTM D-3167-76 with the following modification. Test strips measuring 0.5 inch (12.7 cm) wide were cut along the lengthwise direction of the bonded aluminum panels. A tensile testing machine operated at a rate of 6 inches/minute (30.5 cm/minute) was used to peel the thinner substrate from the thicker one, and the results normalized to a width of one inch (2.54 cm). A SINTECH 20 test machine (MTS Corporation, Eden Prairie, Minn.) was used for Floating Roller Peel Testing in accordance with ASTM D-3167-76.

EXAMPLES

Typical procedure to make the film adhesive:
1. Modification of epoxy by soft flexible reactive oligomer (EPX):
   Reactant A: 174 g ECN 1299, 53.4 g EPON 1004, 35 g EPON 1002, and 157 g of EPX were mixing together at 150° C. to 175° C., and held for 3 hours to complete the reaction. Afterwards, 259 g of MY-0510 and 10 g of KEVLAR PULP were added and mixed in well. The resulting epoxy resin was coded as Reactant A.
   Reactant B: 174 g ECN 1299, 53.4 g EPON 1004, 35 g EPON 1002, and 157 g of EPX were mixed together at 150° C. to 175° C., and held for 3 hours to complete the reaction. Afterwards, 259 g of MY-0510 was added and mixed in well. The resulting epoxy resin was coded as Reactant B.
2. Following the amounts indicated in Table 2, Reactant A, Reactant B, ATPES, or phenolic OH-terminated polyether sulfone and epoxy resins were mixed together, and the mixture was put into a hot oven at 150 C° F. to 175° C. oven for completing the reaction between terminal hydroxy groups and epoxide groups. After 2 to 4 hours, the reaction was complete. In the cases where Reactant B was used, fumed silica was added and dispersed with a high-speed mixer (for mixtures including Reactant A, no fumed silica was added). After mixing well, the aluminum powder was added, along with antioxidant, curatives, and Z-6040 in cases that include it. Mixing using a high-speed mixer was performed, until the mixture was well mixed. Mixing time was kept to no longer than 3 minutes after adding the curatives, taking care that the temperature of the mixture did not exceed about 120° C.
3. The mixture was immediately used to draw a film on a silicone coated liner. A film adhesive coated on a silicone liner was achieved and used for measuring mechanical performance.

TABLE 2

Film Adhesive Formulations (amount values in grams)

| Sample | EX-1 | EX-2 | CEX-3C | EX-4 | EX-5 | EX-6 | EX-7 | EX-8 | EX-9 |
|---|---|---|---|---|---|---|---|---|---|
| Reactant A | 688 | 688 | 688 | 688 | 688 | 688 | 688 | 0 | 688 |
| Reactant B | 0 | 0 | 0 | 0 | 0 | 0 | 0 | 688 | 0 |
| DICY | 11.5 | 11.5 | 12.6 | 11.5 | 11.5 | 11.5 | 11.5 | 11.5 | 11.5 |
| DDS | 250 | 250 | 275 | 250 | 250 | 250 | 250 | 250 | 250 |
| Al | 600 | 650 | 800 | 600 | 600 | 600 | 600 | 0 | 600 |
| VW-10700RP | 0 | 0 | 0 | 0 | 0 | 0 | 0 | 30 | 30 |
| VW-10200RP | 0 | 0 | 0 | 0 | 0 | 0 | 30 | 0 | 0 |
| P 1800 | 0 | 0 | 0 | 0 | 0 | 30 | 0 | 0 | 0 |
| ATPES | 30 | 20 | 0 | 60 | 30 | 0 | 0 | 0 | 0 |
| R816 | 0 | 0 | 0 | 0 | 0 | 0 | 0 | 32 | 0 |
| MY-0510 | 60 | 60 | 29.3 | 60 | 60 | 60 | 60 | 60 | 60 |
| Z-6040 | 10 | 0 | 0 | 10 | 0 | 0 | 0 | 0 | 0 |
| S-9228 | 3 | 3 | 3 | 3 | 2 | 2 | 2 | 2 | 2 |
| IRGANOX 1010 | 3 | 3 | 3 | 3 | 2 | 2 | 2 | 2 | 2 |

The film adhesives of Examples EX-1 to EX-9 were tested for Overlap Shear ("OLS") and Floating Roller Peel ("FRP") Strength, with results as summarized in Table 3.

TABLE 3

| | | | Test Data | | |
|---|---|---|---|---|---|
| Sample | EX-1 | EX-2 | CEX-3C | EX-4 | EX-5 |
| OLS at RT, psi (MPa) | 5040 (35.0) | 3982 (27.6) | 4481 (31.1) | 4025 (28.0) | 4734 (32.9) |
| OLS at 177° C., psi (MPa) | 3196 (22.2) | 2685 (18.6) | 2432 (16.7) | 2391 (16.6) | 2971 (20.6) |
| FRP at RT, piw (N/25 mm) | 19.1 (84.0) | 14.7 (64.7) | 11.7 (51.5) | 17.1 (75.2) | 22.4 (98.6) |
| Sample | EX-6 | EX-7 | EX-8 | EX-9 | |
| OLS at RT, psi (MPa) | 4733 (32.9) | 4821 (33.5) | 4699 (32.6) | 4801 (33.3) | |
| OLS at 177° C., psi (MPa) | 2789 (19.4) | 3074 (21.4) | 3191 (22.2) | 3047 (21.2) | |
| FRP at RT, piw (N/25 mm) | 19.5 (85.8) | 17.4 (76.6) | 19.5 (85.8) | 20.1 (88.4) | |

Comparative example CEX-3C omits polyether sulfone and is seen to exhibit reduced floating roller peel ("FRP") strength.

Aging Test

Samples of film example EX-5 were prepared for overlap sheer testing as described above, using primed aluminum panels. Samples were tested for overlap sheer strength at room temperature and 177° C. under three conditions: no aging, aging for 1000 hours at 177° C., and aging for 6000 hours at 177° C. In the RT test, the films lost 10% of their strength after 1000 hours and 16% of their strength after 6000 hours. In the 177° C. test, the films lost 3% of their strength after 1000 hours at 177° C. and 16% of their strength after 6000 hours at 177° C. Thus film EX-5 demonstrated excellent retention of strength with aging.

Various modifications and alterations of this disclosure will become apparent to those skilled in the art without departing from the scope and principles of this disclosure, and it should be understood that this disclosure is not to be unduly limited to the illustrative embodiments set forth hereinabove.

I claim:

1. A structural adhesive film comprising a branched or networked polymer which is the reaction product of one or more polyether sulfone polymers selected from the group consisting of amine-terminated polyether sulfone polymers, hydroxy-terminated polyether sulfone polymers, and combinations thereof, with epoxy-functional chemical species including the reaction product of one or more first polyepoxides with an amine-terminated branched polytetrahydrofuran polymer, wherein said epoxy-functional chemical species additionally include one or more second polyepoxides, wherein at least one second polyepoxide comprises three or more epoxide groups per molecule and further wherein the one or more second polyepoxides and the reaction product of one or more first polyepoxides with an amine-terminated branched polytetrahydrofuran polymer are present in the epoxy-functional chemical species in a first weight ratio of greater than 0.05:1.00 and less than 4.0:1.0.

2. The structural adhesive film according to claim 1 wherein at least one first polyepoxide comprises three or more epoxide groups per molecule.

3. The structural adhesive film according to claim 1 wherein the one or more polyether sulfone polymers are selected from the group consisting of hydroxy-terminated polyether sulfone polymers.

4. The structural adhesive film according to claim 1, wherein the one or more polyether sulfone polymers include at least one hydroxy-terminated polyether sulfone polymer and at least one amine-terminated polyether sulfone polymer.

5. A structural adhesive film comprising a branched or networked polymer which is the reaction product of one or more polyether sulfone polymers selected from the group consisting of amine-terminated polyether sulfone polymers, hydroxy-terminated polyether sulfone polymers, and combinations thereof, with epoxy-functional chemical species including the reaction product of one or more first polyepoxides with an amine-terminated branched polytetrahydrofuran polymer, additionally comprising a coupling agent comprising a) one or more functional groups selected from amine, hydroxy and epoxide, and b) one or more functional groups selected from alkoxy silane groups.

6. A structural adhesive film comprising a branched or networked polymer which is the reaction product of one or more polyether sulfone polymers selected from the group consisting of amine-terminated polyether sulfone polymers, hydroxy-terminated polyether sulfone polymers, and combinations thereof, with epoxy-functional chemical species including the reaction product of one or more first polyepoxides with an amine-terminated branched polytetrahydrofuran polymer, wherein the reaction product of one or more first polyepoxides with an amine-terminated branched polytetrahydrofuran polymer incorporates the one or more first polyepoxides and the amine-terminated branched polytetrahydrofuran polymer in a second weight ratio of greater than 1.2:1.0 and less than 3.0:1.0.

7. The structural adhesive film according to claim 1 wherein the branched or networked polymer incorporates the one or more polyether sulfone polymers and the epoxy-functional chemical species in a third weight ratio of greater than 0.010:1.000 and less than 0.300:1.000.

8. The structural adhesive film according to claim 1 wherein the amine-terminated branched polytetrahydrofuran polymer has a Mw of greater than 9000 g/mol and less than 15000 g/mol.

9. The structural adhesive film according to claim 1 which comprises no species comprising non-aromatic carbon-carbon double bonds.

10. The structural adhesive film according to claim 1 additionally comprising one or more fillers selected from the group consisting of aluminum particles, polyaramid particles, polyimide particles, silica particles, and fumed silica particles.

11. The structural adhesive film according to claim 1 additionally comprising one or more epoxy curatives.

12. A cured film obtained by curing the structural adhesive film according to claim 1.

13. A bond comprising the cured film according to claim 12 bound to each of a first and second adherend.

14. The structural adhesive film according to claim 6 wherein at least one first polyepoxide comprises three or more epoxide groups per molecule.

15. The structural adhesive film according to claim 6 wherein the one or more polyether sulfone polymers are selected from the group consisting of hydroxy-terminated polyether sulfone polymers.

16. The structural adhesive film according to claim 6, wherein the one or more polyether sulfone polymers include at least one hydroxy-terminated polyether sulfone polymer and at least one amine-terminated polyether sulfone polymer.

17. The structural adhesive film according to claim 6 wherein the amine-terminated branched polytetrahydrofuran polymer has a $M_w$ of greater than 9000 g/mol and less than 15000 g/mol.

18. A cured film obtained by curing the structural adhesive film according to claim 6.

19. A bond comprising the cured film according to claim 18, bound to each of a first and second adherend.

20. A cured film obtained by curing the structural adhesive film according to claim 5.

\* \* \* \* \*